United States Patent
Odoriba

(10) Patent No.: US 10,374,526 B2
(45) Date of Patent: Aug. 6, 2019

(54) OBSTRUCTION DETECTION DEVICE AND MONITOR DEVICE

(71) Applicant: PANASONIC INTELLECTUAL PROPERTY MANAGEMENT CO., LTD., Osaka (JP)

(72) Inventor: Yuki Odoriba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/404,762

(22) Filed: Jan. 12, 2017

(65) Prior Publication Data
US 2017/0264218 A1 Sep. 14, 2017

(30) Foreign Application Priority Data
Mar. 8, 2016 (JP) .................................. 2016-044169

(51) Int. Cl.
| | |
|---|---|
| H02P 3/06 | (2006.01) |
| G01B 7/30 | (2006.01) |
| B64D 43/00 | (2006.01) |
| G01S 17/08 | (2006.01) |

(52) U.S. Cl.
CPC ............... *H02P 3/06* (2013.01); *B64D 43/00* (2013.01); *G01B 7/30* (2013.01); *G01S 17/08* (2013.01)

(58) Field of Classification Search
USPC ......................................................... 318/417
See application file for complete search history.

(56) References Cited

U.S. PATENT DOCUMENTS

| | | | |
|---|---|---|---|
| 5,096,271 A | 3/1992 | Portman | |
| 6,424,386 B1* | 7/2002 | Shimizu ............. | B64D 11/0015 312/223.1 |
| 8,915,410 B2* | 12/2014 | Maeda ................ | B60R 11/0235 224/311 |
| 2007/0176891 A1 | 8/2007 | Sano et al. | |

FOREIGN PATENT DOCUMENTS

| | | |
|---|---|---|
| JP | 2000-217050 A | 8/2000 |
| JP | 2007-199104 | 8/2007 |
| JP | 2013-237339 A | 11/2013 |
| JP | 2014-202809 | 10/2014 |
| JP | 2014202809 A * | 10/2014 |

* cited by examiner

*Primary Examiner* — Jorge L Carrasquillo
(74) *Attorney, Agent, or Firm* — McDermott Will & Emery LLP

(57) ABSTRACT

A monitor device includes exterior panel, chassis partly or wholly surrounded by exterior panel, and disposed so as to be movable in an internal space of exterior panel, a base member that movably supports chassis, first switch and second switch that detect a change of a relative position between exterior panel and chassis, a motor that causes chassis to move with respect to the base member, and a CPU that controls driving of the motor in response to a change of a relative position between exterior panel and chassis detected by first switch and second switch.

7 Claims, 16 Drawing Sheets

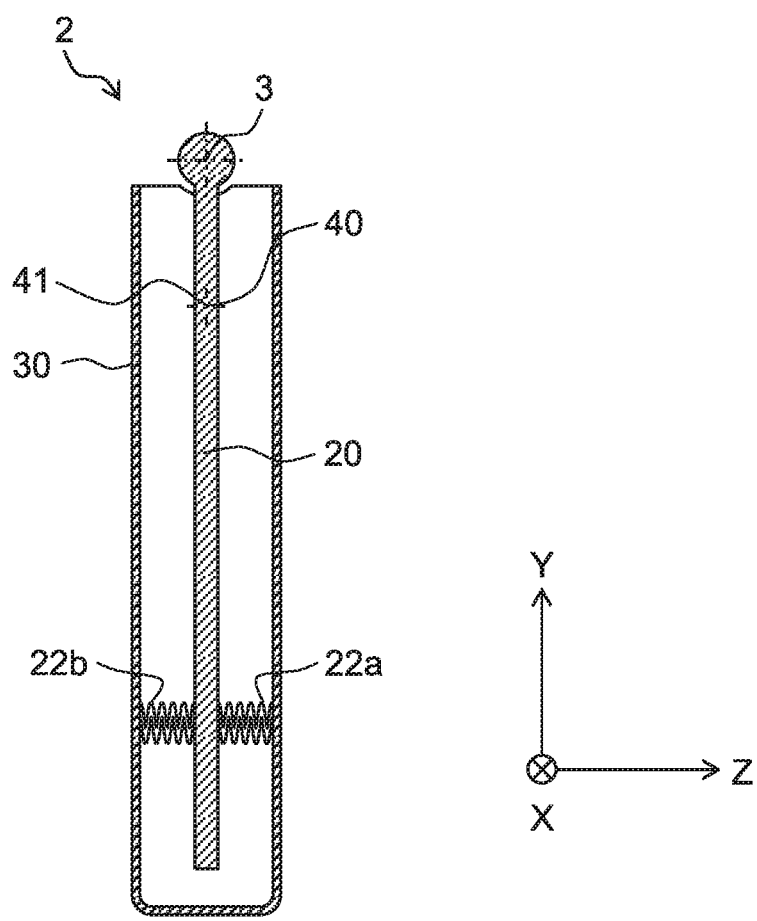

OBSTRUCTION DETECTION DEVICE AND MONITOR DEVICE

RELATED APPLICATIONS

This application claims the benefit of Japanese Application No. 2016-044169, filed on Mar. 8, 2016, the disclosure of which Application is incorporated by reference herein.

BACKGROUND

1. Technical Field

The present disclosure relates to an obstruction detection device that detects collision of an obstruction.

2. Description of the Related Art

Patent Literature 1 (Unexamined Japanese Patent Publication No. 2014-202809) discloses an openable monitor device. This monitor device includes an obstruction detector, and causes a monitor to move to a storage position when detecting pressing to a rear panel of the monitor. According to this configuration, when a human or an object collides with the rear panel of the monitor, it is possible to perform control such that the monitor is stored at the storage position.

SUMMARY

The present disclosure provides an obstruction detection device capable of detecting collision in both directions of a front surface side and a back surface side.

An obstruction detection device according to the present disclosure includes: an exterior panel; a chassis partly or wholly surrounded by the exterior panel, and movably disposed in an internal space of the exterior panel; and a detection unit for detecting a change of a relative position between the exterior panel and the chassis.

The obstruction detection device according to the present disclosure can detect collision in both directions of a front surface side and a back surface side.

BRIEF DESCRIPTION OF THE DRAWINGS

FIG. 9 is a diagram illustrating an internal structure of a monitor according to a second exemplary embodiment;

DETAILED DESCRIPTION

Hereinafter, exemplary embodiments are suitably described in detail with reference to drawings. However, more than necessary detailed description is sometimes omitted. For example, detailed description of already well-known matters, and repeated description of substantially the same configurations are sometimes omitted. This is because the following description is prevented from unnecessarily becoming redundant, and understanding of a person skilled in the art is facilitated.

The attached drawings and the following description are provided in order that a person skilled in the art sufficiently understands the present disclosure, and do not intend to limit the subject matter recited in the scope of the claims.

First Exemplary Embodiment

Monitor device 10 according to a first exemplary embodiment of the present disclosure is described with reference to FIG. 1 to FIG. 8B.

Figure 1:
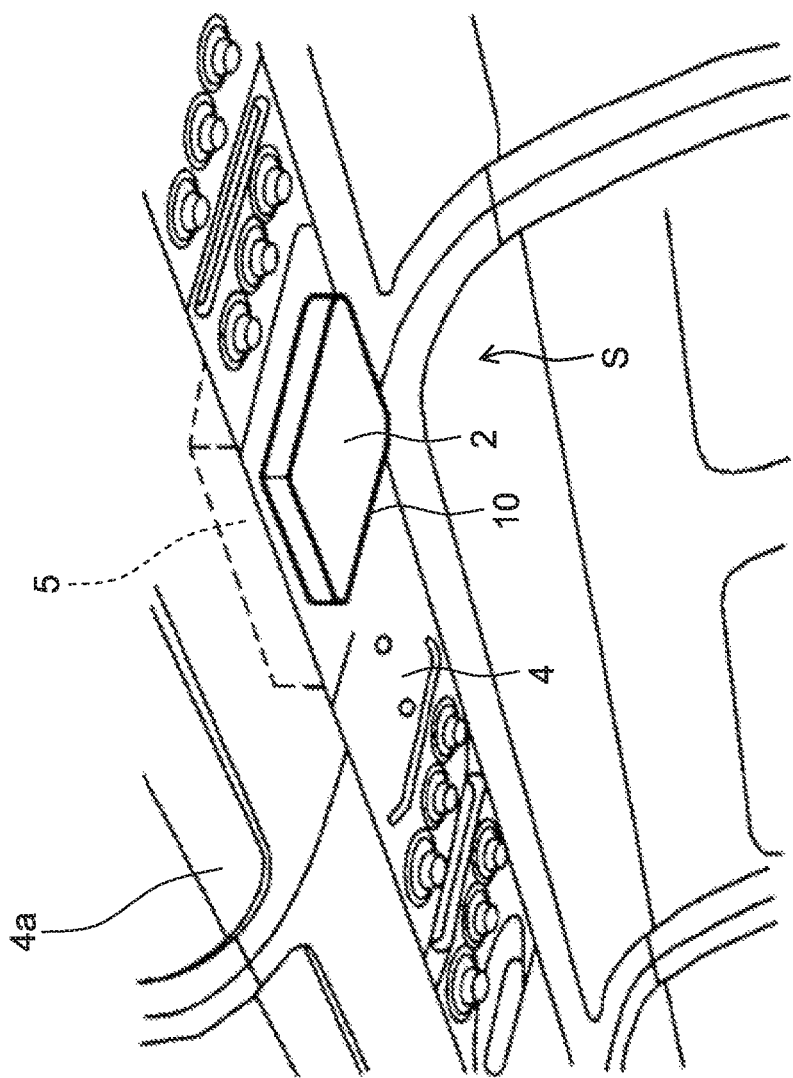
FIG. 1 is a perspective view for illustrating a closed state of a monitor device according to a first exemplary embodiment.
Figure 2:
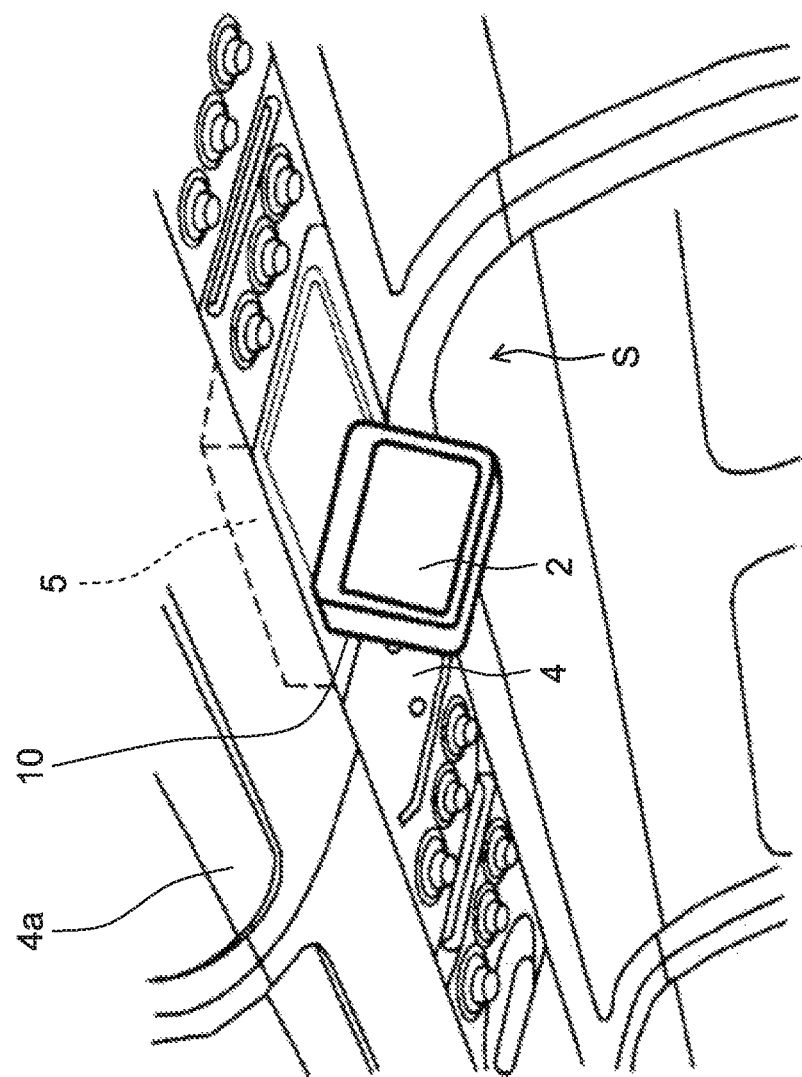
FIG. 2 is a perspective view for illustrating an open state of the monitor device according to the first exemplary embodiment.

FIG. 1 is a perspective view for illustrating a closed state of monitor device 10 according to the first exemplary embodiment. More specifically, FIG. 1 is a perspective view for illustrating the closed state where monitor device 10 is installed on ceiling 4 in a cabin of an aircraft, and monitor 2 is in the closed state. FIG. 2 is a perspective view for illustrating an open state of monitor device 10 according to the first exemplary embodiment. More specifically, FIG. 2 is a perspective view for illustrating the open state during use of monitor 2 in monitor device 10.

As illustrated in FIG. 1 and FIG. 2, monitor device 10 is provided on ceiling 4 of cabin S of the passenger aircraft, particularly, below openable baggage rack 4a forming a part of ceiling 4. Monitor device 10 includes monitor 2 capable of displaying video, and base member 5 for storing monitor 2. Monitor 2 is movable between the closed state where the monitor is stored in base member 5, and the open state where the monitor is exposed from base member 5 by rotational movement from the closed state. Monitor 2 is an example of an obstruction detection device according to the present disclosure.

[1-1. Configuration of Monitor 2]

Figure 3:
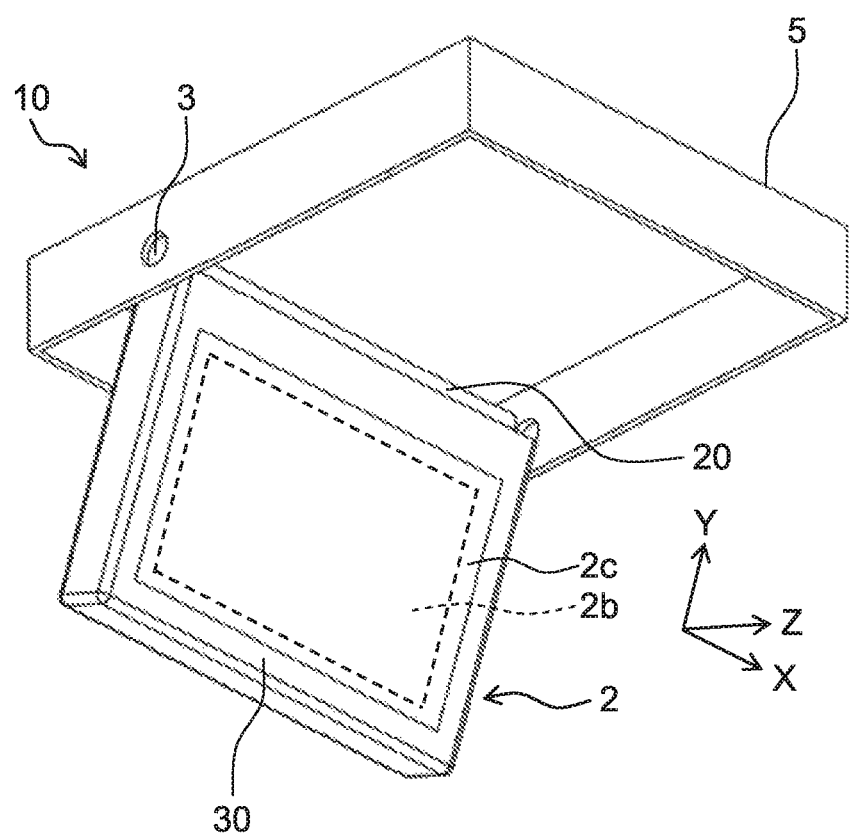
FIG. 3 is an external perspective view of the monitor device according to the first exemplary embodiment.
Figure 4:
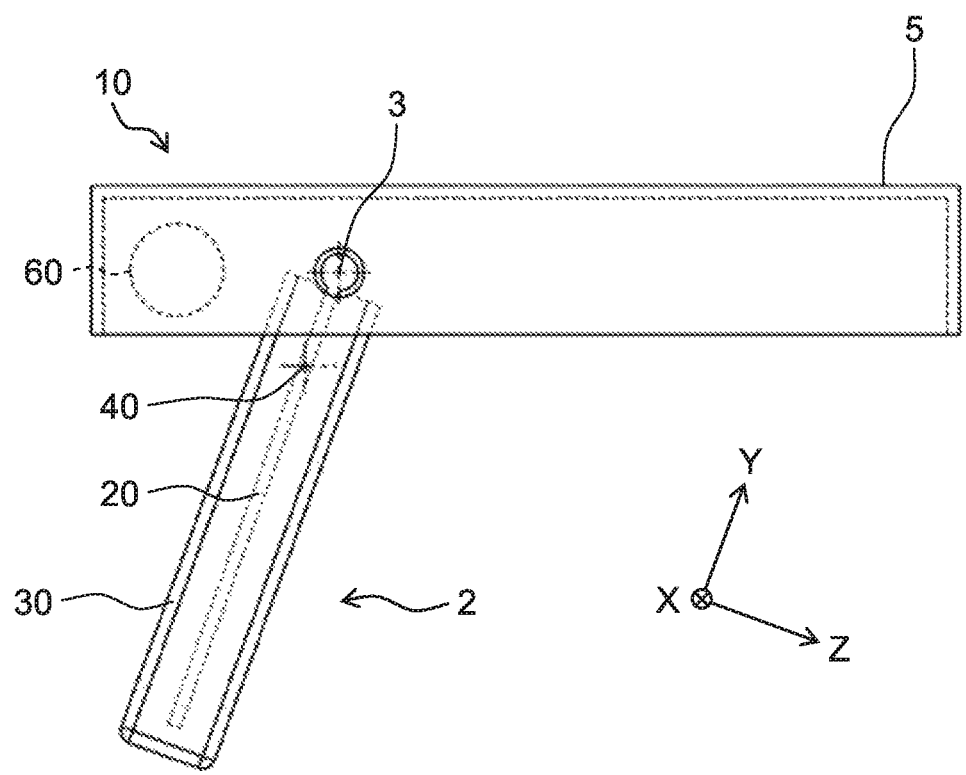
FIG. 4 is a side view of the monitor device according to the first exemplary embodiment.
Figure 5:
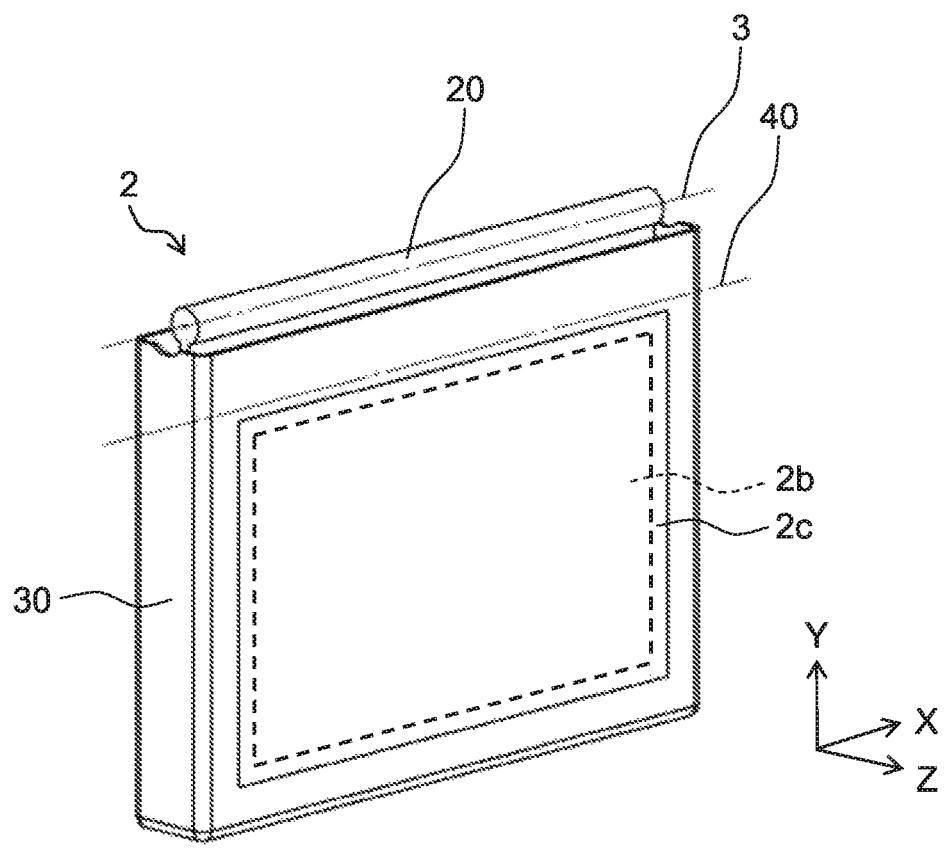
FIG. 5 is an external perspective view of a monitor according to the first exemplary embodiment.

FIG. 3 is an external perspective view of monitor device 10 according to the first exemplary embodiment. FIG. 4 is a side view of monitor device 10 according to the first exemplary embodiment. FIG. 3 and FIG. 4 each illustrate the open state where monitor 2 of monitor device 10 is open. FIG. 5 is an external perspective view of monitor 2 according to the first exemplary embodiment.

As illustrated in FIG. 3 to FIG. 5, monitor device 10 includes motor 60 for rotationally driving monitor 2, and rotating shaft 3 which is a rotation center of monitor 2 with respect to base member 5. Rotating shaft 3 rotatably couples monitor 2 with base member 5. Monitor 2 includes chassis 20, exterior panel 30, and liquid crystal panel 2b.

Herein, a direction in which monitor 2 moves so as to bring into the open state is defined as a back surface direction, and a direction in which monitor 2 moves so as to bring into the closed state is defined as a front surface direction. In the following description, in each member, a surface, directed in the front surface direction, of monitor 2 is referred to as a front surface, and a surface, directed in the back surface direction, of monitor 2 is referred to as a back surface.

As illustrated in FIG. 3, the front surface and the back surface of monitor 2 each have a substantially rectangular shape in which a length in a width direction (longitudinal direction) is longer than a length in a height direction (transverse direction), in the open state. Additionally, monitor 2 is mounted on base member 5 such that the longitudinal direction is parallel to rotating shaft 3.

Herein, for convenience of explanation, a direction along the longitudinal direction of monitor 2 is defined as an X-axis, a direction along the transverse direction is defined as a Y-axis, and a direction along a normal line to the front surface and the back surface of chassis 20 disposed in monitor 2 is defined as a Z-axis. For example, it can be said that a direction of rotating shaft 3 is parallel to the X-axis.

The above configuration of monitor 2 is an example, and the present disclosure is not limited to this.

Chassis 20 is a component assembling stand of monitor 2. Chassis 20 is connected to rotating shaft 3 at an end in a Y-axis direction. That is, base member 5 rotatably supports chassis 20 at rotating shaft 3. An almost whole of chassis 20 is surrounded by exterior panel 30 except a connecting part with rotating shaft 3, and is disposed so as to be movable in an internal space of exterior panel 30. Herein, in exterior panel 30, a surface material exists on each of a front surface side and a back surface side with chassis 20 between the front surface side and the back surface side. The internal space means an area located between the surface materials on the front surface side and the back surface side of exterior panel 30.

In chassis 20, main electronic components of monitor device 10, including liquid crystal panel 2b and CPU 15 (Central Processing Unit, refer to FIG. 7, and described in detail below) are disposed. Liquid crystal panel 2b is disposed in chassis 20 such that a surface corresponding to a display unit is located on the front surface side of monitor 2.

Exterior panel 30 is a box-shaped exterior component provided so as to surround a whole of monitor 2 (i.e., so as to surround chassis 20).

Exterior panel 30 is held by chassis 20 at first shaft 40 provided in parallel to the X-axis. First shaft 40 is provided at a position closer to rotating shaft 3 than a center of chassis 20 in the Y-axis direction, and holds both side surfaces of exterior panel 30. Exterior panel 30 is rotatable around first shaft 40 with respect to chassis 20 in a slight range. That is, when exterior panel 30 slightly rotates around first shaft 40, a distal end of exterior panel 30 slightly moves in a substantially Z-axis direction with respect to chassis 20. Herein, the distal end of exterior panel 30 means an end, on a side far from rotating shaft 3 in the transverse direction (Y-axis direction), of exterior panel 30.

Liquid crystal panel 2b is fixed to chassis 20. Exterior panel 30 has an opening corresponding to the display unit of liquid crystal panel 2b. In the opening of exterior panel 30, colorless and transparent protective panel 2c is fixed. Liquid crystal panel 2b is capable of displaying video based on an externally input video signal. Additionally, liquid crystal panel 2b is configured such that the video displayed on liquid crystal panel 2b can be visually recognized through protective panel 2c from outside of exterior panel 30.

Monitor 2 can perform rotary motion around rotating shaft 3 parallel to the X-axis in a range from the closed state where the monitor is parallel to a plane of base member 5 to the open state where the monitor is open at about 110 degrees with respect to the plane of base member 5. Monitor 2 is driven by motor 60. Motor 60 is an example of an actuator according to the present disclosure.

Figure 6:
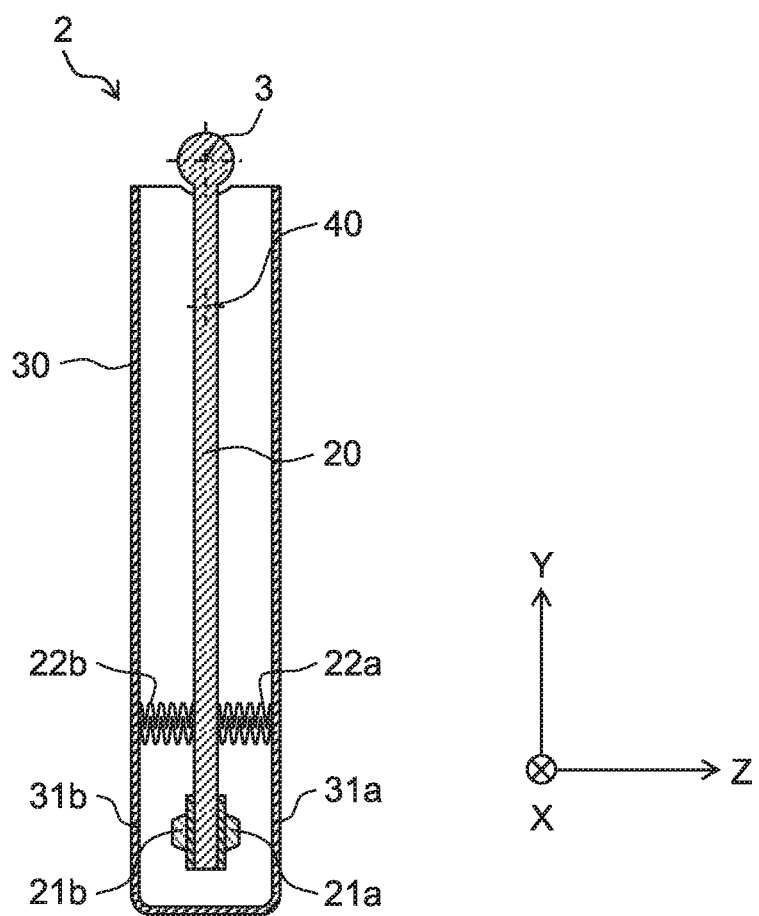
FIG. 6 is a diagram illustrating an internal structure of the monitor according to the first exemplary embodiment.

FIG. 6 is a diagram illustrating an internal structure of monitor 2 according to the first exemplary embodiment. More specifically, FIG. 6 is a diagram illustrating the internal structure of monitor 2 as viewed from the X-axis direction. Herein, a distal end of monitor 2 means an end, on a side far from rotating shaft 3 in the transverse direction (Y-axis direction), of monitor 2. Monitor device 10 of this exemplary embodiment includes a configuration for detecting an obstruction at the distal end of monitor 2.

Monitor 2 includes switch 21a and switch 21b. Switch 21a and switch 21b are mounted on chassis 20. Switch 21a is fixed to the front surface of chassis 20. Switch 21b is fixed to the back surface of chassis 20. Switch 21a and switch 21b are two switches each disposed on a different surface on chassis 20 so as to be able to be pressed by exterior panel 30. Switch 21a and switch 21b are an example of a detection unit according to the present disclosure.

Spring 22a and spring 22b are mounted on chassis 20. Spring 22a has a first end fixed to the front surface of chassis 20, and a second end which can contact an inner surface of exterior panel 30. Spring 22b has a first end fixed to the back surface of chassis 20, and a second end which can contact the inner surface of exterior panel 30.

The second ends of spring 22a and spring 22b are in contact with the inner surface of exterior panel 30 in a state where external force such as collision to monitor 2 does not act. Consequently, spring 22a and spring 22b keep intervals between chassis 20 and exterior panel 30 at predetermined distances. Spring 22a and spring 22b expandably contract in the substantially Z-axis direction in a slight range in response to rotational movement of exterior panel 30 around first shaft 40.

Spring 22a and spring 22b may be elastic bodies such as plate springs, air springs, and rubber, in addition to coil springs.

Exterior panel 30 includes pressing part 31a and pressing part 31b. Pressing part 31a is an area on an inner side (back surface side) of a front surface of exterior panel 30, which is the distal end of monitor 2. Pressing part 31a faces switch 21a. Pressing part 31b is an area on an inner side (front surface side) of a back surface of exterior panel 30, which is the distal end of monitor 2. Pressing part 31b faces switch 21b. When exterior panel 30 slightly rotates around first shaft 40 with respect to chassis 20, the distal end of exterior panel 30 moves in the substantially Z-axis direction with respect to a distal end of chassis 20. Consequently, exterior panel 30 is capable of approaching and separating with respect to the front surface and the back surface of chassis 20. That is, switch 21a and switch 21b are disposed on chassis 20 so as to be able to be pressed by exterior panel 30, resulting from movement of exterior panel 30 with respect to chassis 20. More specifically, switch 21a and switch 21b are disposed on chassis 20 so as to be able to be pressed by pressing of pressing part 31a and pressing part 31b, respectively, of exterior panel 30, resulting from movement of exterior panel 30 with respect to chassis 20.

Figure 7:
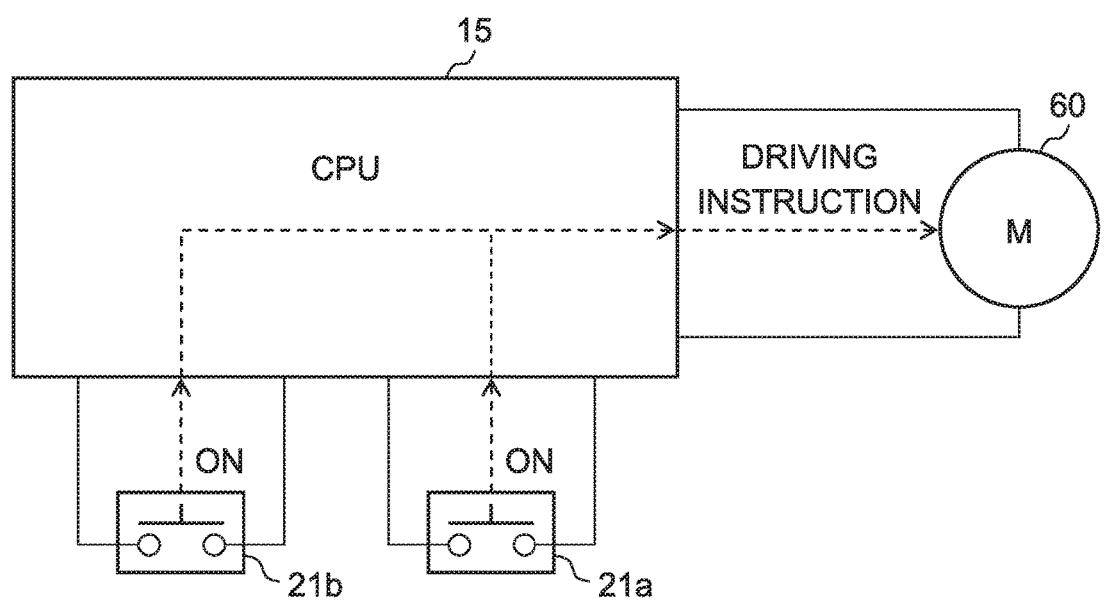
FIG. 7 is a block diagram illustrating an electric configuration related to collision detection of the monitor device according to the first exemplary embodiment.

FIG. 7 is a block diagram illustrating an electric configuration related to collision detection of monitor device 10 according to the first exemplary embodiment. Monitor device 10 includes CPU 15, switch 21a, switch 21b, and motor 60. As illustrated in FIG. 7, switch 21a, switch 21b, and motor 60 are connected to CPU 15. When a human or an object collides with monitor 2 of monitor device 10, and a position of exterior panel 30 (refer to FIG. 6) changes relative to chassis 20 (refer to FIG. 6), switch 21a or switch 21b is turned on (ON). That is, switch 21a and switch 21b detect a change of a relative position between exterior panel 30 and chassis 20. That is, switch 21a and switch 21b are pressed, so that a change of a relative position between exterior panel 30 and chassis 20 is detected. When it is detected that switch 21a or switch 21b is turned on, CPU 15 that controls driving of motor 60 by a driving instruction.

CPU 15 is an example of a controller according to the present disclosure.

[1-2. Operation of Monitor 2]

In a case where exterior panel 30 of monitor 2 receives predetermined external force, monitor device 10 of this exemplary embodiment causes the monitor to automatically move to the closed state or the open state. Hereinafter, operation at this time is described.

[1-2-1. Operation During Development of Monitor 2]

Figure 8A:
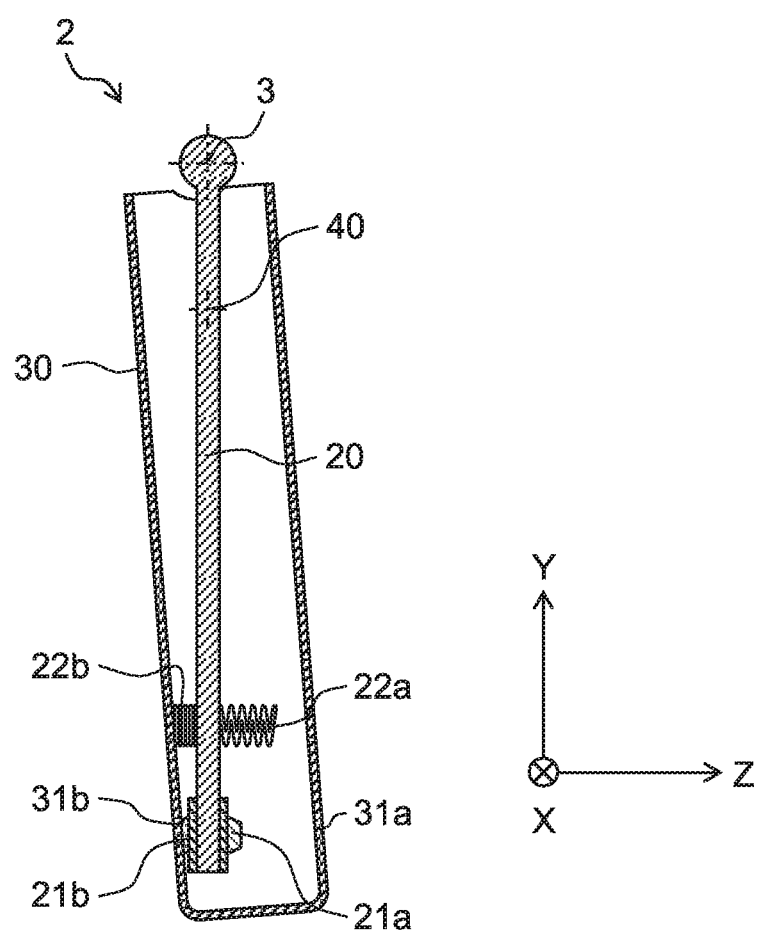
FIG. 8A is a diagram illustrating operation when external force is applied to an exterior panel of the monitor according to the first exemplary embodiment.

FIG. 8A is a diagram illustrating operation when external force is applied to exterior panel 30 of monitor 2 according to the first exemplary embodiment. More specifically, FIG. 8A is a diagram illustrating operation when external force in the front surface direction is applied to the back surface side of exterior panel 30 during development of monitor 2 from the closed state to the open state in monitor device 10 (refer to FIG. 4), or in the open state. A case where CPU 15 (refer to FIG. 7) gives a driving instruction to motor 60 (refer to FIG. 7), and predetermined external force in the front surface direction is applied to the back surface side of exterior panel 30 during operation where motor 60 causes monitor 2 to rotate from the closed state to the open state, or in the open state is considered. At this time, spring 22b contracts to a first length (length illustrated in FIG. 8A, the same shall apply hereinafter) by the external force applied to exterior panel 30. Then, exterior panel 30 slightly rotates around first shaft 40 in the front surface direction with respect to chassis 20. Pressing part 31b moves so as to approach chassis 20 at the distal end of monitor 2. When pressing part 31b approaches chassis 20, and a distance between pressing part 31b and the back surface of chassis 20 contracts up to a first distance (distance illustrated in FIG. 8A, the same shall apply hereinafter), pressing part 31b presses switch 21b fixed to the back surface of chassis 20 in. Switch 21b is pressed in, so that CPU 15 detects this press-in. CPU 15 gives a driving instruction to motor 60. Motor 60 causes monitor 2 to rotate in a direction from the open state to the closed state. Consequently, monitor 2 returns to the closed state.

When monitor 2 rotates in the direction from the open state to the closed state, and the predetermined external force applied to exterior panel 30 is lost, spring 22b returns to an initial length (length illustrated in FIG. 6). Exterior panel 30 rotated in the front surface direction returns to an original position by restoring force of the spring, and switch 21b is turned off.

In a case where external force applied to exterior panel 30 does not exceed a predetermined value, spring 22b does not contract up to the first length. Accordingly, pressing part 31b does not move until the distance between the back surface of chassis 20 and pressing part 31b reaches the first distance. Therefore, pressing part 31b does not press switch 21b in.

[1-2-2. Operation During Storage of Monitor 2]

Figure 8B:
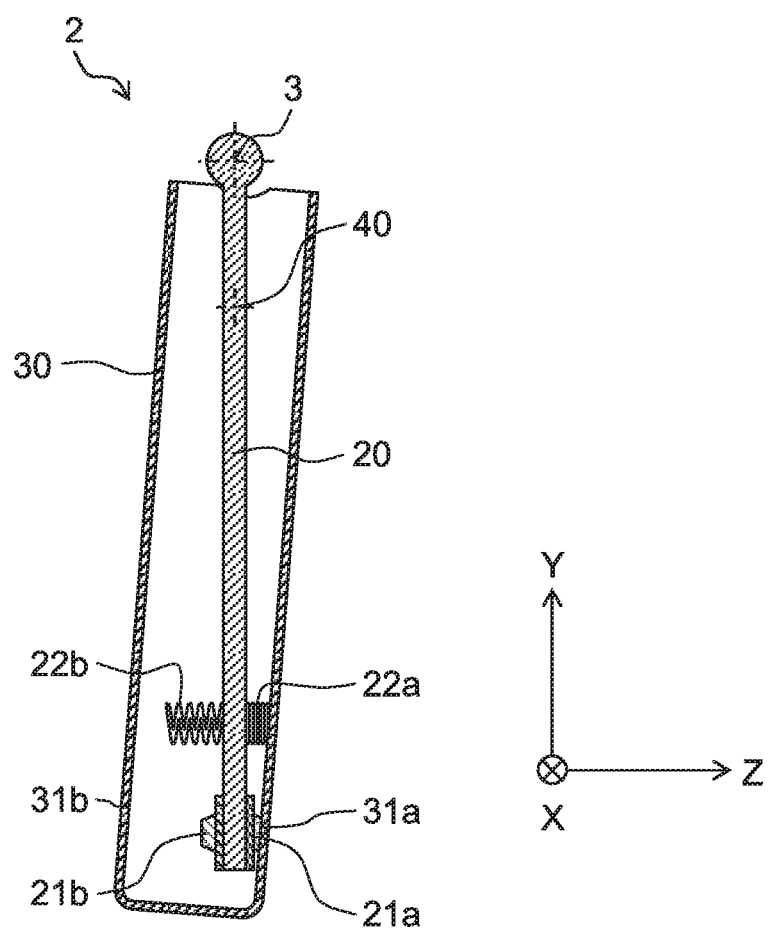
FIG. 8B is a diagram illustrating operation when external force is applied to the exterior panel of the monitor according to the first exemplary embodiment.

FIG. 8B is a diagram illustrating operation when external force is applied to exterior panel 30 of monitor 2 according to the first exemplary embodiment. More specifically, FIG. 8B is a diagram illustrating operation when external force in the back surface direction is applied to the front surface side of exterior panel 30 during storage of monitor 2 from the open state to the closed state in monitor device 10 (refer to FIG. 4). A case where CPU 15 (refer to FIG. 7) gives a driving instruction to motor 60 (refer to FIG. 7), and predetermined external force in the back surface direction is applied to the front surface side of exterior panel 30 during operation where motor 60 causes monitor 2 to rotate from the open state to the closed state is considered. At this time, spring 22a contracts up to a second length (length illustrated in FIG. 8B, the same shall apply hereinafter) by the external force applied to exterior panel 30. Then, exterior panel 30 slightly rotates around first shaft 40 in the back surface direction with respect to chassis 20. Pressing part 31a moves so as to approach chassis 20 at the distal end of monitor 2. When pressing part 31a approaches chassis 20, a distance between pressing part 31a and the front surface of chassis 20 contracts up to a second distance (distance illustrated in FIG. 8B, the same shall apply hereinafter), pressing part 31a presses switch 21a fixed to the back surface of chassis 20 in. Switch 21a is pressed in, so that CPU 15 detects this press-in. CPU 15 gives a driving instruction to motor 60. Motor 60 causes monitor 2 to rotate in the direction from the closed state to the open state. Consequently, monitor 2 returns to the open state.

When monitor 2 rotates in the direction from the closed state to the open state, and the predetermined external force applied to exterior panel 30 is lost, spring 22a returns to the initial length (length illustrated in FIG. 6). Exterior panel 30 rotated in the back surface direction returns to the original position by restoring force of the spring, and switch 21a is turned off.

In a case where external force applied to exterior panel 30 does not exceed a predetermined value, spring 22a does not contract up to the second length. Accordingly, pressing part 31a does not move until the distance between the front surface of chassis 20 and pressing part 31a reaches the second distance. Therefore, pressing part 31a does not press switch 21a in.

Also in a case where external force in the back surface direction is not applied to exterior panel 30, but applied to protective panel 2c fixed in the opening on the front surface side of exterior panel 30 during storage of monitor 2 from the open state to the closed state in monitor device 10, exterior panel 30 to which protective panel 2c is fixed moves so as to approach chassis 20. Then, the distance between pressing part 31a on exterior panel 30 and the front surface of chassis 20 contracts up to the second distance, pressing part 31a presses switch 21a in. When switch 21a is turned on, CPU 15 detects this press-in, and gives the driving instruction to motor 60. Motor 60 causes monitor 2 to rotate in the direction from the closed state to the open state. Consequently, monitor 2 returns to the open state. When the predetermined external force applied to protective panel 2c is lost, intervals between protective panel 2c and exterior panel 30 returns to original intervals by restoring force of the spring, and switch 21a is turned off.

As described above, switch 21a and switch 21b detect a change of a relative position between exterior panel 30 and chassis 20 in a plurality of directions.

[1-3. Effects and the Like]

As described above, in this exemplary embodiment, monitor 2 includes exterior panel 30, chassis 20 partly or wholly surrounded by exterior panel 30, and disposed so as to be movable in the internal space of exterior panel 30, and switch 21a and switch 21b that detect a change of a relative position between exterior panel 30 and chassis 20.

In this exemplary embodiment, monitor device 10 includes exterior panel 30, chassis 20 partly or wholly surrounded by exterior panel 30, and disposed so as to be movable in the internal space of exterior panel 30, base member 5 that movably supports chassis 20, switch 21a and switch 21b that detect a change of a relative position between exterior panel 30 and chassis 20, motor 60 that causes chassis 20 to move with respect to base member 5, and CPU 15 that controls driving of motor 60 in response to a change of a relative position between exterior panel 30 and chassis 20 detected by switch 21a and switch 21b.

Consequently, for example, in a case where a head of a passenger hits the back surface side of exterior panel 30, a relative position between exterior panel 30 and chassis 20 changes, and switch 21a and switch 21b can detect this as the predetermined external force. Monitor device 10 can cause monitor 2 to shift to the closed state based on this detection result. Similarly, during storage of monitor 2, for example, also in a case where a hand of a passenger is caught in the front surface side of exterior panel 30, a relative position between exterior panel 30 and chassis 20 changes, and switch 21a and switch 21b can detect this as the predetermined external force. Monitor device 10 can cause monitor 2 to shift to the open state based on this detection result.

Thus, in monitor 2 of this exemplary embodiment, even in a case where external force is applied to any of the front surface and the back surface of exterior panel 30, switch 21a or switch 21b on a board of chassis 20 can detect this. Additionally, monitor device 10 can control driving of motor 60 based on this detection result. That is, monitor device 10 of this exemplary embodiment is effective for performing openable operation in response to collision in both directions of the front surface side and the back surface side of monitor 2.

In this exemplary embodiment, switch 21a and switch 21b are pressed, so that a change of a relative position between exterior panel 30 and the chassis is detected.

Consequently, for example, compared to a configuration where collision is detected by monitoring of a load current to motor 60, the collision can be more reliably detected without an influence of variation of detection timing by an individual difference for each motor, during development and storage of monitor 2, namely, in a state where motor 60 is being operated. Additionally, collision can be detected also in the open state of monitor 2, namely, also in a case where motor 60 is not operated.

In this exemplary embodiment, exterior panel 30 and chassis 20 are disposed so as to be each rotatable around first shaft 40.

Consequently, even when an obstruction hits any portion of the surface material existing on each of the front surface side and the back surface side of exterior panel 30, exterior panel 30 rotates around first shaft 40 with respect to chassis 20, and switch 21a or switch 21b is pressed in. Accordingly, for example, switches do not need to be disposed respective four corners of each of the front surface and the back surface of chassis 20, and one switch is disposed on each of the front surface side and the back surface side, so that it is possible to detect collision in both directions of the front surface side and the back surface side.

In this exemplary embodiment, spring 22a and spring 22b that are elastic bodies hold spaces between chassis 20 and exterior panel 30.

Consequently, also during development of monitor 2 or during storage of monitor 2, when external force does not act on exterior panel 30, exterior panel 30 rotates in synchronization with chassis 20, the intervals between chassis 20 and exterior panel 30 are kept constant. Therefore, it is possible to prevent malfunction of monitor 2 caused by erroneous pressing of switch 21a and switch 21b. Additionally, a spring constant is suitably set, so that it is possible to arbitrarily determine a threshold value of magnitude of external force to be detected. Therefore, it is possible to detect arbitrary external force.

In this exemplary embodiment, exterior panel 30 is formed in a box shape so as to surround a substantially whole of chassis 20.

Consequently, compared to a configuration in which a front surface of an exterior panel is fixed to a chassis, only a back surface of the exterior panel relatively moves with respect to the chassis, and an obstruction is detected by a switch, any gap is not needed in side surfaces of monitor 2. Accordingly, appearance quality of monitor 2 is improved. Additionally, it is possible to prevent entering of liquid, and therefore reliability of monitor 2 is improved.

Second Exemplary Embodiment

Monitor device 10 according to a second exemplary embodiment of the present disclosure is described with reference to FIG. 9 to FIG. 11B.

Monitor device 10 according to the second exemplary embodiment is different from monitor device 10 according to the first exemplary embodiment in an internal structure of monitor 2 and a detection unit for detecting an obstruction. Other parts are similar to the parts of monitor device 10 according to the first exemplary embodiment, and therefore detailed description is omitted.

[2-1. Configuration of Monitor 2]

FIG. 9 is a diagram illustrating the internal structure of monitor 2 according to the second exemplary embodiment. More specifically, FIG. 9 is a diagram illustrating the internal structure of monitor 2 as viewed from an X-axis direction.

Monitor 2 includes chassis 20, exterior panel 30, spring 22a, spring 22b, and angle sensor 41.

Angle sensor 41 is coaxially mounted on first shaft 40. Angle sensor 41 outputs an electric signal (voltage) in response to a relative angle of exterior panel 30 with respect to chassis 20 around first shaft 40. As illustrated in FIG. 9, spring 22a and spring 22b keep intervals between chassis 20 and exterior panel 30 at predetermined distances, in a state where external force such as collision does not act on monitor 2. At this time, angle sensor 41 is assumed to output a first voltage. Angle sensor 41 is an example of the detection unit according to the present disclosure.

Figure 10:
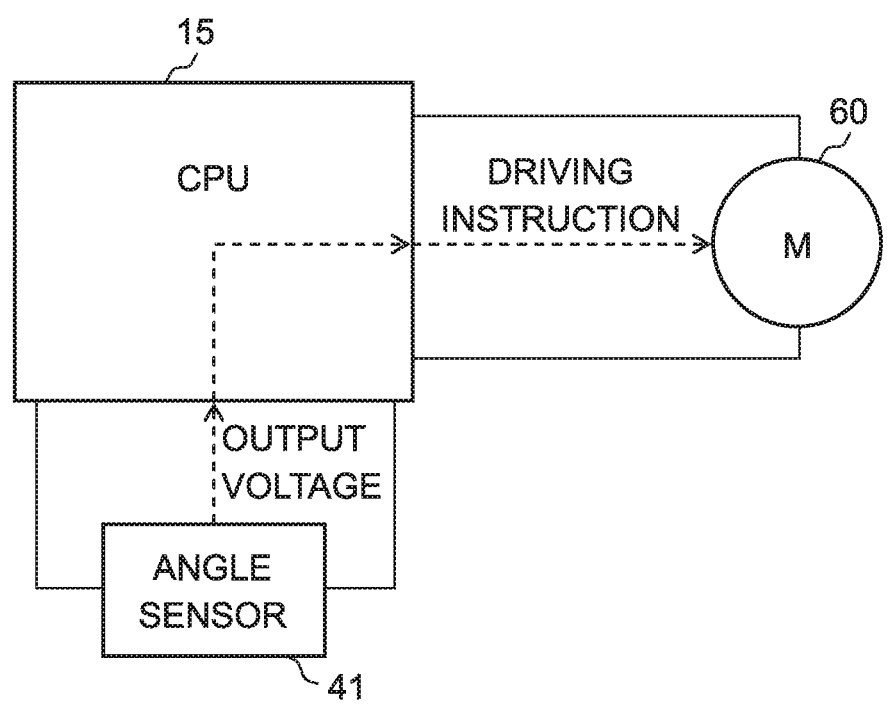
FIG. 10 is a block diagram illustrating an electric configuration related to collision detection of a monitor device according to the second exemplary embodiment.

FIG. 10 is a block diagram illustrating an electric configuration related to collision detection of monitor device 10 according to the second exemplary embodiment. Monitor device 10 includes CPU 15, angle sensor 41 and motor 60. As illustrated in FIG. 10, angle sensor 41 and motor 60 are connected to CPU 15. When a human or an object collides with monitor device 10, and a position of exterior panel 30 changes relative to chassis 20, the output voltage of angle sensor 41 changes and CPU 15 detects this. CPU 15 that controls driving of motor 60 by a driving instruction in response to a change of the output voltage of angle sensor 41.

[2-2. Operation of Monitor 2]

In a case where exterior panel 30 of monitor 2 receives predetermined external force, monitor device 10 of this exemplary embodiment causes the monitor to automatically move to a closed state or an open state. Hereinafter, operation at this time is described.

In a case where external force does not act on exterior panel 30, angle sensor 41 outputs the first voltage.

[2-2-1. Operation During Development of Monitor 2]

Figure 11A:
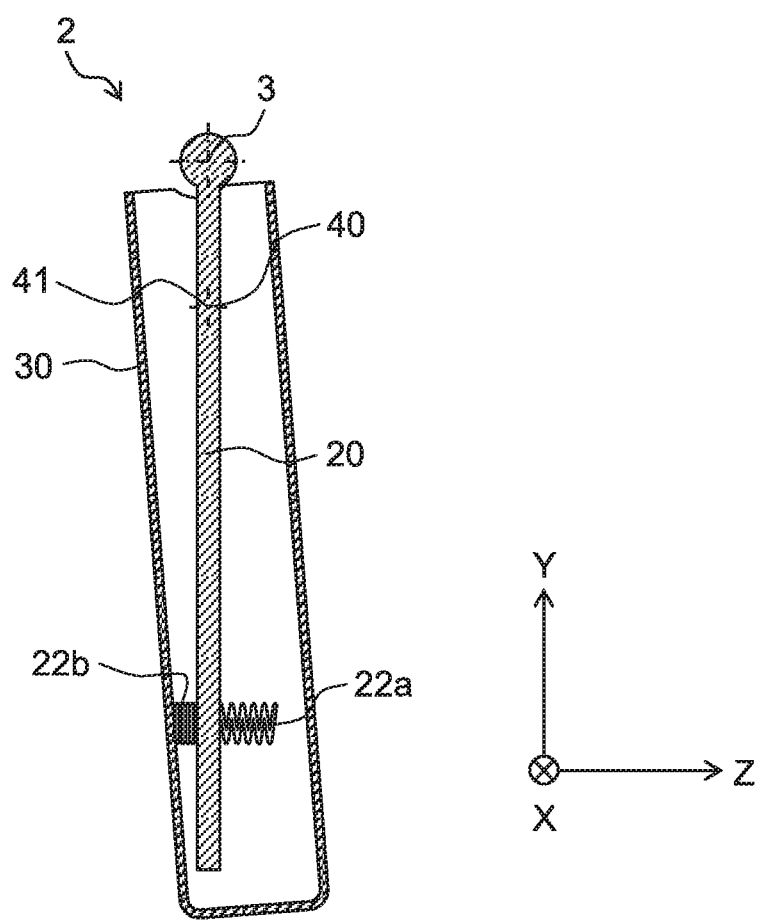
FIG. 11A is a diagram illustrating operation when external force is applied to an exterior panel of the monitor according to the second exemplary embodiment.

FIG. 11A is a diagram illustrating operation when external force is applied to exterior panel 30 of monitor 2 according to the second exemplary embodiment. More specifically, FIG. 11A is a diagram illustrating operation when external force in a front surface direction is applied to a back surface side of exterior panel 30 during development of monitor 2 from the closed state to the open state in monitor device 10 (refer to FIG. 4), or in the open state. A case where CPU 15 (refer to FIG. 10) gives a driving instruction to motor 60 (refer to FIG. 10), and predetermined external force in the front surface direction is applied to the back surface side of exterior panel 30 during operation where motor 60 causes monitor 2 to rotate from the closed state to the open state, or in the open state is considered. At this time, spring 22b contracts to a third length (length illustrated in FIG. 11A, the same shall apply hereinafter) by the external force applied to exterior panel 30. Then, exterior panel 30 slightly rotates around first shaft 40 in the front surface direction with respect to chassis 20. The back surface side of exterior panel 30 moves so as to approach chassis 20 at a distal end of monitor 2. The back surface side of exterior panel 30 moves so as to approach chassis 20, so that a relative angle of exterior panel 30 with respect to chassis 20 changes. At this time, the output voltage of angle sensor 41 changes from the first voltage.

When the back surface side of exterior panel 30 approaches chassis 20, a distance between the back surface side of exterior panel 30 and a back surface of chassis 20 contracts up to a third distance (distance illustrated in FIG. 11A, the same shall apply hereinafter), angle sensor 41 outputs a second voltage. When CPU 15 detects the second voltage, CPU 15 gives a driving instruction to motor 60. Motor 60 causes monitor 2 to rotate in a direction from the open state to the closed state. Consequently, monitor 2 returns to the closed state.

When monitor 2 rotates in a direction from the open state to the closed state, and the predetermined external force applied to exterior panel 30 is lost, spring 22a returns to an initial length (length illustrated in FIG. 9). Exterior panel 30 rotated in the front surface direction returns to an original position by restoring force of the spring, and the output of angle sensor 41 returns to the first voltage from the second voltage.

In a case where external force applied to exterior panel 30 does not exceed a predetermined value, spring 22b does not contract up to the third length. Accordingly, the back surface side of exterior panel 30 does not move until the distance between the back surface side of exterior panel 30 and the back surface of chassis 20 reaches the third distance. Therefore, while the output voltage of angle sensor 41 changes from the first voltage, angle sensor 41 does not output the second voltage.

[2-2-2. Operation During Storage of Monitor 2]

Figure 11B:
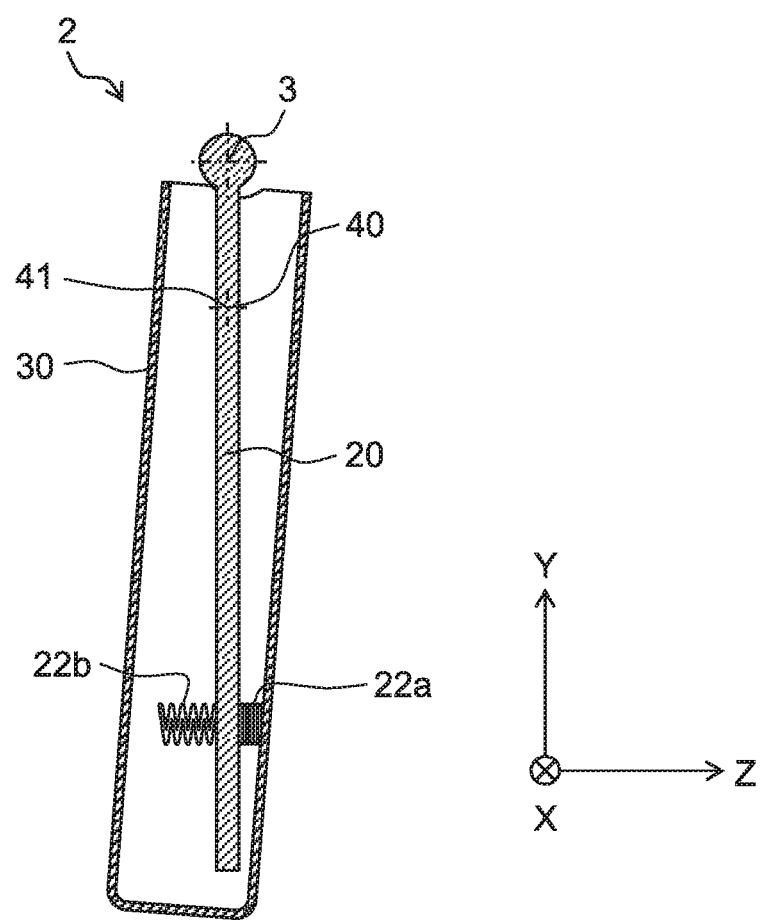
FIG. 11B is a diagram illustrating operation when external force is applied to the exterior panel of the monitor according to the second exemplary embodiment.

FIG. 11B is a diagram illustrating operation when external force is applied to exterior panel 30 of monitor 2 according to the second exemplary embodiment. More specifically, FIG. 11B is a diagram illustrating operation when external force in a back surface direction is applied to a front surface side of exterior panel 30 during storage of monitor 2 from the open state to the closed state in monitor device 10 (refer to FIG. 4). A case where CPU 15 (refer to FIG. 10) gives a driving instruction to motor 60 (refer to FIG. 10), and predetermined external force in the back surface direction is applied to the front surface side of exterior panel 30 during operation where motor 60 causes monitor 2 to rotate from the open state to the closed state is considered. At this time, spring 22a contracts up to a fourth length (length illustrated in FIG. 11B, the same shall apply hereinafter) by the external force applied to exterior panel 30. Then, exterior panel 30 slightly rotates around first shaft 40 in the back surface direction with respect to chassis 20. The front surface side of exterior panel 30 moves so as to approach chassis 20 at the distal end of monitor 2. The front surface side of exterior panel 30 moves so as to approach chassis 20, so that the relative angle of exterior panel 30 with respect to chassis 20 changes. At this time, the output voltage of angle sensor 41 changes from the first voltage.

When the front surface side of exterior panel 30 approaches chassis 20, a distance between the front surface side of exterior panel 30 and the front surface of chassis 20 contracts up to a fourth distance (distance illustrated in FIG. 11B, the same shall apply hereinafter), angle sensor 41 outputs a third voltage. When CPU 15 detects the third voltage, CPU 15 gives a driving instruction to motor 60. Motor 60 causes monitor 2 to rotate in the direction from the closed state to the open state. Consequently, monitor 2 returns to the open state.

When monitor 2 rotates in the direction from the closed state to the open state, and the predetermined external force applied to exterior panel 30 is lost, spring 22b returns to the initial length (length illustrated in FIG. 9). Exterior panel 30 rotated in the back surface direction returns to the original position by restoring force of the spring, and the output of angle sensor 41 returns to the first voltage from the third voltage.

In a case where external force applied to exterior panel 30 does not exceed the predetermined value, spring 22a does not contract up to the fourth length. Accordingly, the front surface side of exterior panel 30 does not move until the distance between the front surface side of exterior panel 30 and the front surface of chassis 20 reaches the fourth distance. Therefore, while the output voltage of angle sensor 41 changes from the first voltage, angle sensor 41 does not output the third voltage.

Also in a case where external force in the back surface direction is not applied to exterior panel 30, but applied to protective panel 2c during storage of monitor 2 from the open state to the closed state in monitor device 10, exterior panel 30 to which protective panel 2c is fixed moves so as to approach chassis 20. Then, the distance between the front surface side of exterior panel 30 and the front surface of chassis 20 contracts up to the fourth distance, angle sensor 41 outputs the third voltage. When the output of angle sensor 41 becomes the third voltage, CPU 15 detects this, and gives a driving instruction to motor 60. Motor 60 causes monitor 2 to rotate in the direction from the closed state to the open state. Consequently, monitor 2 returns to the open state. When the predetermined external force applied to protective panel 2c is lost, intervals between protective panel 2c and exterior panel 30 return to original intervals by restoring force of the spring, and angle sensor 41 outputs the first voltage.

[2-3. Effects and the Like]

As described above, in this exemplary embodiment, monitor 2 includes exterior panel 30, chassis 20 partly or wholly surrounded by exterior panel 30, and disposed so as to be movable in an internal space of exterior panel 30, and angle sensor 41 that detects a change of a relative position between exterior panel 30 and chassis 20.

In this exemplary embodiment, monitor device 10 includes exterior panel 30, chassis 20 partly or wholly surrounded by exterior panel 30, and disposed so as to be movable in the internal space of exterior panel 30, base member 5 that movably supports chassis 20, angle sensor 41 that detects a change of a relative position between exterior panel 30 and chassis 20, motor 60 that causes chassis 20 to move with respect to base member 5, and CPU 15 that controls driving of motor 60 in response to a change of a relative position between exterior panel 30 and chassis 20 detected by angle sensor 41.

Consequently, for example, in a case where a head of a passenger hits the back surface side of exterior panel 30, the relative angle between exterior panel 30 and chassis 20 changes, and angle sensor 41 can detect this as the predetermined external force. Monitor device 10 can cause monitor 2 to shift to the closed state, based on this detection result. Similarly, during storage of monitor 2, for example, also in a case where a hand of a passenger is caught in the front surface side of exterior panel 30, angle sensor 41 can detect this as the predetermined external force. Monitor device 10 can cause monitor 2 to shift to the open state, based on this detection result. Thus, in monitor 2 of this exemplary embodiment, even in a case where external force is applied to any of the front surface and the back surface of exterior panel 30, angle sensor 41 disposed on first shaft 40 can detect this. Additionally, monitor device 10 can control driving of motor 60 based on this detection result. That is, monitor device 10 of this exemplary embodiment is effective for performing openable operation in response to collision in both directions of the front surface side and the back surface side of monitor 2.

Other Exemplary Embodiments

As described above, the first and second exemplary embodiments are merely described as examples of a technology disclosed in this application. However, the technology according to the present disclosure is not limited to these, and is applicable for exemplary embodiments which are changed, replaced, added, omitted or the like. Additionally, a new exemplary embodiment by combination of the components described in the above first and second exemplary embodiments is also possible. Hereinafter, other exemplary embodiments are exemplified.

[1] In the first and second exemplary embodiments, CPU 15 is disposed on chassis 20. The place where CPU 15 is disposed is not limited to this. For example, CPU 15 may be disposed on base member 5.

[2] In the first and second exemplary embodiments, first shaft 40 is provided at the position closer to rotating shaft 3 than the center of chassis 20 in the Y-axis direction. The place where first shaft 40 is disposed is not limited to this. First shaft 40 may be disposed at the center of chassis 20 in the Y-axis direction, or a position farther from rotating shaft 3 than the center of chassis 20 in the Y-axis direction.

[3] In the first and second exemplary embodiments, exterior panel 30 has the box shape surrounding the whole except the connecting part. The exterior panel may be formed so as to surround a part of chassis 20. For example, in a case where an obstruction on the front surface side and the back surface side of monitor 2 is detected, the exterior panel only needs to have the surface materials on at least the front surface side and the back surface side, and side surfaces (surfaces perpendicular to the X-axis) or upper and lower surfaces (surfaces perpendicular to the Y-axis) of chassis 20 may not be surrounded by the surface materials of exterior panel 30.

That is, chassis 20 according to the present disclosure only needs to be partially or wholly surrounded by exterior panel 30.

[4] In the first and second exemplary embodiments, spring 22a and spring 22b are provided on chassis 20. Spring 22a and spring 22b may be disposed on exterior panel 30.

[5] In the first exemplary embodiment, switch 21a and switch 21b are used in order to detect collision. The configuration for detecting collision is not limited to this. A distance sensor may be used in place of switch 21a and switch 21b. The distance sensor is an example of the detection unit according to the present disclosure. The distance sensor is disposed inside exterior panel 30, and detects a distance between exterior panel 30 and chassis 20.

As the distance sensor, for example, a sensor of a TOF (Time Of Flight) system or a triangulation system, which applies a laser beam to an object, and obtains a distance by a light receiving position of reflected light detected by a photodetector disposed at a position deviated from an optical axis, is considered. Additionally, a proximity sensor that applies infrared light or the like to an object and detects approach of an object from intensity of reflected light may be used as the distance sensor. The distance sensor outputs an electric signal in response to the distance between exterior panel 30 and chassis 20. CPU 15 controls motor 60 in response to this electric signal, similarly to the case of the first exemplary embodiment.

At this time, the distance sensors may be disposed on the front surface and the back surface of chassis 20 in place of switch 21a and switch 21b. At this time, in a case where the distance between the inner surface of exterior panel 30 and the back surface of chassis 20 becomes shorter than the first distance, operation similar to the operation in the case where switch 21b is pressed in, according to the first exemplary embodiment, only needs to be performed. In a case where the distance between the inner surface of exterior panel 30 and the front surface of chassis 20 becomes shorter than the second distance, operation similar to the operation in the case where switch 21a is pressed in, according to the first exemplary embodiment, only needs to be performed.

When the distance sensor is a sensor capable of outputting two threshold values, at least one distance sensor only needs to be disposed on any one of the front surface side and the back surface side of chassis 20. Herein, for example, a case where the distance sensor is disposed on the back surface side in place of switch 21b is described. In a case where the distance between the inner surface of exterior panel 30 and the back surface of chassis 20 becomes shorter than the first distance, operation similar to the operation in the case where switch 21b is pressed in, according to the first exemplary embodiment, only needs to be performed. On the other hand, a distance between the inner surface of exterior panel 30 and the front surface of chassis 20 when the distance between the inner surface of exterior panel 30 and the front surface of chassis 20 becomes close to the second distance is defined as a fifth distance. In a case where the distance between the inner surface of exterior panel 30 and the back surface of chassis 20 becomes longer than the fifth distance, operation similar to the operation in the case where switch 21a is pressed in, according to the first exemplary embodiment, only needs to be performed.

[6] In the first exemplary embodiment, switch 21a and switch 21b are provided on chassis 20. Switch 21a and switch 21b may be disposed on exterior panel 30. In this case, when the front surface side or the back surface side of exterior panel 30 approaches chassis 20 by external force acting on exterior panel 30, switch 21a or switch 21b are pressed in by chassis 20, and turned on. CPU 15 detects this, and controls motor 60 similarly to the case of the first exemplary embodiment. However, in a case where switch 21a and switch 21b are disposed on exterior panel 30, wiring needs to be performed between moving exterior panel 30 and chassis 20. Therefore, like the first exemplary embodiment, switch 21a and switch 21b are desirably provided on chassis 20.

[7] In the first exemplary embodiment, two switch 21a and switch 21b are provided on the front surface side and the back surface side of chassis 20. The number of the switches may be one. Hereinafter, an example of a configuration of a case where one switch is provided is described.

At a distal end of chassis 20 (which means an end, on a side far from rotating shaft 3 in the Y-axis direction, of chassis 20), a three-position type toggle switch is provided. In three positions of the toggle switch, left, center, and right are ON, OFF, and ON, respectively. The toggle switch is provided at the distal end of chassis 20 such that a back surface side and a front surface side correspond to the left and the right, respectively. When the toggle switch is being pressed left, the left is ON. When the toggle switch is being pressed right, the right is ON. In a case other than the above two cases, the toggle switch returns to the center, and is turned off. Additionally, exterior panel 30 has two pressing parts protruding toward the toggle switch, on inner surface of a front surface side and a back surface side. Herein, the toggle switch is an example of the detection unit according to the present disclosure.

When external force is applied to exterior panel 30, and the toggle switch is pressed by the pressing part, the toggle switch falls on the front surface side or the back surface side, and the right or the left becomes ON. When the toggle switch is not pressed by the pressing part, the toggle switch returns to the center, and is turned off. Operation when the right or the left becomes ON is similar to operation in the case where switch 21a or switch 21b is pressed in, according to the first exemplary embodiment.

That is, the detection unit according to the present disclosure only needs to include at least one switch disposed on chassis 20 so as to be able to be pressed by exterior panel 30.

[8] In the first exemplary embodiment, exterior panel 30 is held rotatably around first shaft 40 with respect to chassis 20. Exterior panel 30 only needs to be held movably relative to chassis 20. For example, exterior panel 30 may be held by springs at a plurality of places.

Figure 12A:
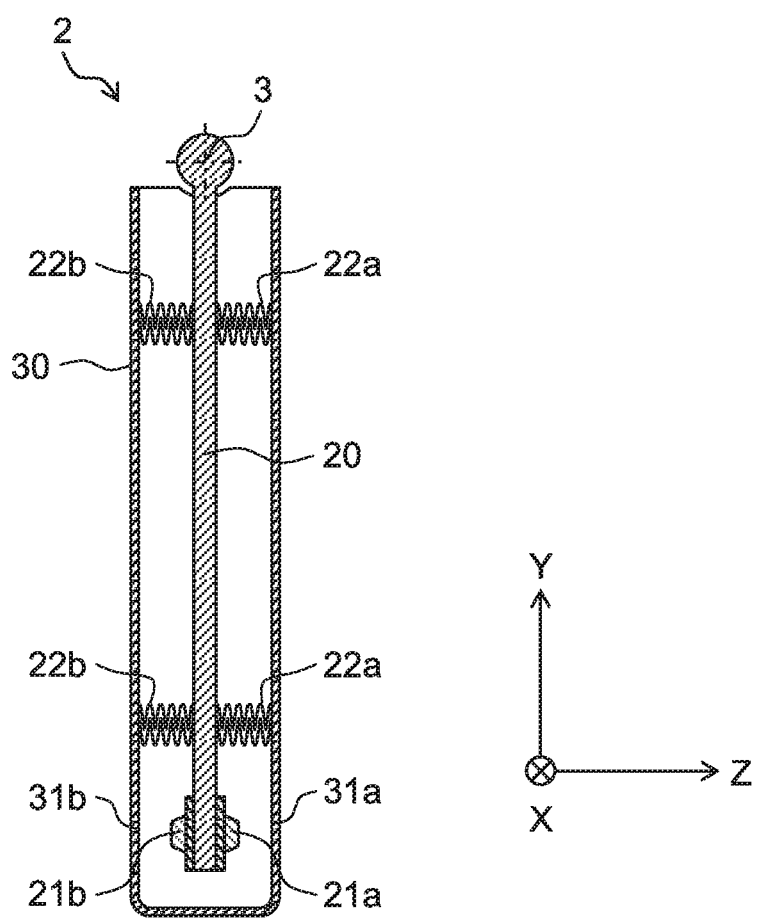
FIG. 12A is a diagram illustrating an internal structure of a monitor according to an example of another exemplary embodiment.

FIG. 12A is a diagram illustrating an internal structure of monitor 2 according to an example of another exemplary embodiment. More specifically, FIG. 12A is a diagram illustrating the internal structure of monitor 2 as viewed from the X-axis direction. As illustrated in the figure, in place of first shaft 40, spring 22a and spring 22b are disposed near a distal end of monitor 2 and on an end on a side close to rotating shaft 3. Thus, exterior panel 30 can be held movably relative to chassis 20.

Figure 12B:
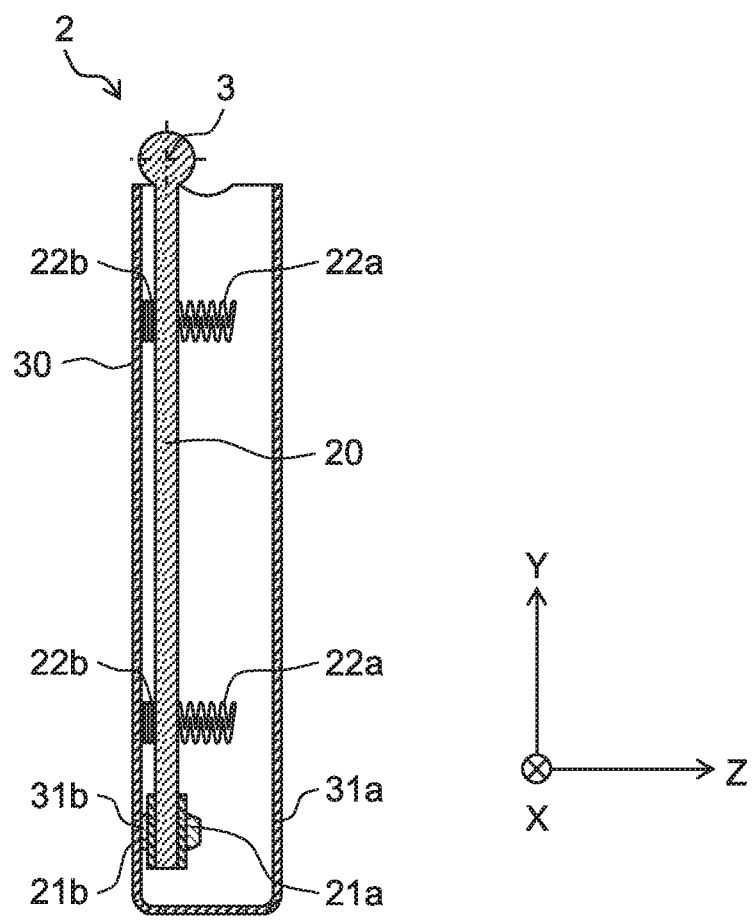
FIG. 12B is a diagram illustrating operation when external force is applied to an exterior panel of the monitor according to the example of another exemplary embodiment.

FIG. 12B is a diagram illustrating operation when external force is applied to exterior panel 30 of monitor 2 according to one example of another exemplary embodiment. More specifically, FIG. 12B is a diagram illustrating operation when external force in a front surface direction is applied to a back surface side of exterior panel 30 during development of monitor 2 from a closed state to an open state in monitor device 10, or in the open state. When predetermined external force is applied, and pressing part 31b approaches chassis 20, a distance between pressing part 31b and a back surface of chassis 20 contracts up to a first distance, so that pressing part 31b presses switch 21b disposed on a board in.

Figure 12C:
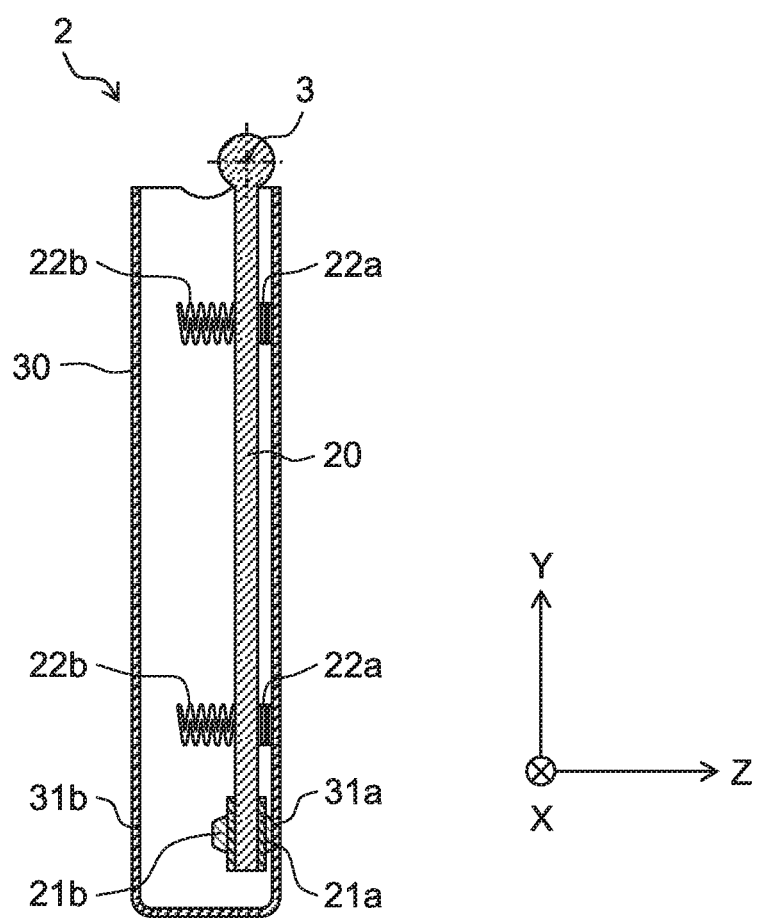
FIG. 12C is a diagram illustrating operation when external force is applied to the exterior panel of the monitor according to the example of another exemplary embodiment.

FIG. 12C is a diagram illustrating operation when external force is applied to exterior panel 30 of monitor 2 according to one example of another exemplary embodiment. More specifically, FIG. 12C is a diagram illustrating operation when external force in a back surface direction is applied to a front surface side of exterior panel 30 during storage of monitor 2 from an open state to a closed state in monitor device 10. When predetermined external force is applied, and pressing part 31a approaches chassis 20, a distance between pressing part 31a and a front surface of chassis 20 contracts up to a second distance, pressing part 31a presses switch 21a disposed on the board in.

[9] In the first exemplary embodiment, switch 21a and switch 21b are disposed on the front surface and the back surface (surfaces perpendicular to the Z-axis) which are the different surfaces on chassis 20. Switch 21a and switch 21b detect a change of a relative position between exterior panel 30 and chassis 20, in two directions (directions parallel to the Z-axis) of the front surface side and the back surface side, which are a plurality of directions. The different surfaces according to the present disclosure, the plurality of directions according to the present disclosure are not limited to this. For example, in FIG. 12A, two springs and two switches are provided on side surfaces (directions perpendicular to the X-axis) on chassis 20, similarly to the front surface side and the back surface side of chassis 20. Thus, in a case where external force in a direction parallel to the X-axis is applied to the side surface of monitor 2, the switch can detect a change of a relative position between exterior panel 30 and chassis 20, in the direction parallel to the X-axis.

[10] In the first exemplary embodiment, liquid crystal panel 2b is disposed in chassis 20. Video displayed on liquid crystal panel 2b only needs to be visually recognized through protective panel 2c. For example, liquid crystal panel 2b may be disposed in exterior panel 30. Also in this case, external force in the back surface direction is applied to protective panel 2c located outside liquid crystal panel 2b, or exterior panel 30, a change of a relative position between exterior panel 30 and chassis 20 can be detected similarly to the first exemplary embodiment.

Since the exemplary embodiments described above are merely examples of the technology in the present disclosure, it is understood that various modifications, replacements, additions, omissions, and the like can be performed in the scope of the claims or in an equivalent scope thereof.

The present disclosure can be applied to a monitor device capable of performing openable operation in response to collision in both directions of a front surface side and a back surface side of a monitor. More specifically, the present disclosure can be applied to, for example, a monitor device installed in a moving body such as an aircraft, a train, and a bus.

What is claimed is:

1. An obstruction detection device comprising:
  a chassis configured to rotate about a first axis;
  an actuator configured to rotate the chassis about the first axis:
  an exterior panel configured to partly or wholly surround the chassis, the exterior panel being movable with respect to the chassis; and
  a detection unit configured to detect a change of a relative position between the exterior panel and the chassis,
  wherein the exterior panel is rotatable about a second axis independently of the chassis, the second axis extending through a first side surface and a second side surface of the chassis, and the second axis extending parallel to the first axis,
  an upper end of the exterior panel, which is adjacent the first axis, is configured to shift with respect to the first axis when the exterior panel and chassis rotate independently of one another, and
  wherein the exterior panel is coupled to the chassis on a location of each side surface of the exterior panel corresponding to the second axis.

2. The obstruction detection device according to claim 1, wherein the detection unit is at least one switch disposed on the chassis so as to be able to be pressed by the exterior panel, and detects a change of a relative position between the exterior panel and the chassis by pressing of the switch.

3. The obstruction detection device according to claim 2, wherein the switch detects a change of a relative position between the exterior panel and the chassis in a plurality of 2 directions.

4. The obstruction detection device according to claim 2, wherein the detection unit contains two switches and the two switches are each disposed on a different surface on the chassis so as to be able to be pressed by the exterior panel.

5. The obstruction detection device according to claim 1, wherein the detection unit is a distance sensor that is disposed inside the exterior panel, and detects a distance between the exterior panel and the chassis, and detects a change of a relative position between the exterior panel and the chassis by a change of output information of the distance sensor.

6. The obstruction detection device according to claim 1, wherein the exterior panel and the chassis are each disposed rotatably a round a first shaft, and the detection unit is an angle sensor that measures a relative angle between the exterior panel and the chassis around the first shaft, and detects a change of a relative position between the exterior panel and the chassis by a change of output information of the angle sensor.

7. A monitor device comprising:
  a chassis configured to rotate about a first axis;
  an exterior panel configured to partly or wholly surround the chassis, the exterior panel being movable with respect to the chassis;
  a base member that movably supports the chassis;
  a detection unit configured to detect a change of a relative position between the exterior panel and the chassis;
  an actuator that causes the chassis to move with respect to the base member; and
  a controller that controls driving of the actuator in response to a change of a relative position between the exterior panel and the chassis detected by the detection unit;
  wherein the exterior panel is rotatable about a second axis independently of the chassis, the second axis extending through a first side surface and a second side surface of the chassis, and the second axis extending parallel to the first axis,
  an upper end of the exterior panel, which is adjacent the first axis, is configured to shift with respect to the first axis when the exterior panel and chassis rotate independently of one another, and
  wherein the exterior panel is coupled to the chassis on a location of each side surface of the exterior panel corresponding to the second axis.

* * * * *